United States Patent [19]
Wenham

[11] 3,776,264
[45] Dec. 4, 1973

[54] VACUUM RELIEF VALVES

[76] Inventor: Douglas Lee Wenham, 90 Braid Rd., Hamilton, New Zealand

[22] Filed: Aug. 4, 1971

[21] Appl. No.: 168,839

[30] Foreign Application Priority Data
Aug. 4, 1970  New Zealand................161050

[52] U.S. Cl............................... 137/469, 137/526
[51] Int. Cl............................................ F16k 17/20
[58] Field of Search..................... 119/14.40, 14.41; 137/469, 526

[56] References Cited
UNITED STATES PATENTS
2,670,758   3/1954   Harstick et al. ..................... 137/526

*Primary Examiner*—Henry T. Klinksiek
*Attorney*—Holman & Stern

[57] ABSTRACT

A vacuum relief valve has a movable member which coacts with an air inlet and stationary surfaces adjacent the inlet coact with shaped surfaces of the movable member to control the flow of air through the valve over a wide range of rates of flow. The control at high rates is assisted by providing a sharp cornered shoulder on the air inlet to cause a contraction of the entering column of air. The movable member is loaded by an adjustable spring and the movable member is guided by guiding surfaces.

13 Claims, 3 Drawing Figures

VACUUM RELIEF VALVES

BACKGROUND OF THE INVENTION

This invention relates to vacuum relief valves, and has been devised particularly, though not solely, for use as a vacuum relief valve in milking machines.

PRIOR ART

For many years, the vacuum relief valve which has set the standard in milking machine application has been made according to an earlier New Zewland Pat. No. 100138 of the applicant's assignee. This valve was satisfactory for use for many years at the air flows necessary at the time the valve was developed, and for some years thereafter. However, the position has now arisen where more accurate control is required over a wider range than is possible with a valve according to the aforesaid Pat. No. 100138.

OBJECTS AND SUMMARY OF THE INVENTION

It is, therefore, an object of the present invention to provide a vacuum relief valve which will go at least a considerable distance towards meeting present day requirements in a simple yet effective manner, or which will at least provide the public with a useful choice.

Accordingly, in one aspect, the invention consists in a vacuum relief valve comprising a valve chamber, having an air inlet tube leading thereto with which is associated a valve seat, and an air outlet leading from said valve chamber, a valve member or head movable in said valve chamber, said valve member having a conical surface which, in use, coacts with said valve seat to close the valve when the movable member is in contact with the valve seat, said conical surface being connected to curved surfaces on said valve member which join a skirt on said valve member which surrounds said valve air inlet tube, but is spaced apart therefrom, loading means adapted to load said movable valve member, so that a desired degree of reduced pressure is necessary within the valve chamber before the movable member will lift from the valve seat, said air inlet tube being mounted on a shaped substantially frusto-conical member, the length of the skirt being adjusted in relation to the wall of said frusto-conical member and the angle and shape of the surface of said frusto-conical member being adjusted so that in use, on the movable valve member lifting from the valve seat, a flow of air past said conical portion of said movable member and around said curved surfaces will cause an added thrust due to reaction to the movable valve member which will result in increased sensitivity of the valve, and the passage of air between the lower edge of said skirt and the adjacent frusto-conical surface will cause an added lift of the movable valve member at the lower end of the air flow range due to the restriction of the opening between the edge of the skirt and the adjacent part of the surface of the frusto-conical member.

In a further aspect, the invention consists in a vacuum relief valve having a valve head movable in a valve chamber from a valve seat communicating with an air inlet in the form of a tube against loading means to open the valve head, wherein air deflecting means are associated with a face of the valve head adjacent to the air inlet, so that in use the air entering through the air inlet is so deflected by said deflecting means that the consequential added thrust applied to the head will result in increased sensitivity of the valve, and in which one or more of the following features are added:

a. the air inlet tube is mounted on a member having a frusto-conical outer surface, and the head of the valve has a skirt extending to a position which is adjacent said frusto-conical surface in a manner such that at low air inflow, said skirt is close to the cone, and increases the reactive valve head lift at the lower end of the air flow range;

b. the air inlet tube is mounted on a member having an inner frusto-conical surface, there being an annular flat surface at the junction between the tube and the frusto-conical surface so that at higher air flows, the air streamlines will be directed inwardly to give a choking effect through the air inlet in order to control the flow of air to avoid instability of the valve head at high flows;

c. the valve head is guided in said valve chamber by a guide forming part of a guard, the two combining so that air flow past the guiding part of said guard and the guides which are part of said head move and is such that said guides are shielded against fouling;

d. said loading means comprise a hollow cup within the valve head, a spring abutment therein, an open ended low rate spring mounted within said cup, said spring resting on supports in said abutment, the required height on each support being adjusted to give substantially equal pitch to the spring when it is in its compressed working condition, said spring abutting against a further abutment mounted in said valve chamber, said abutment having similar supports to said cup supports.

One preferred form of the invention will now be described with reference to the accompanying drawings in which,

DETAILED DESCRIPTION OF THE INVENTION

Figure 1:
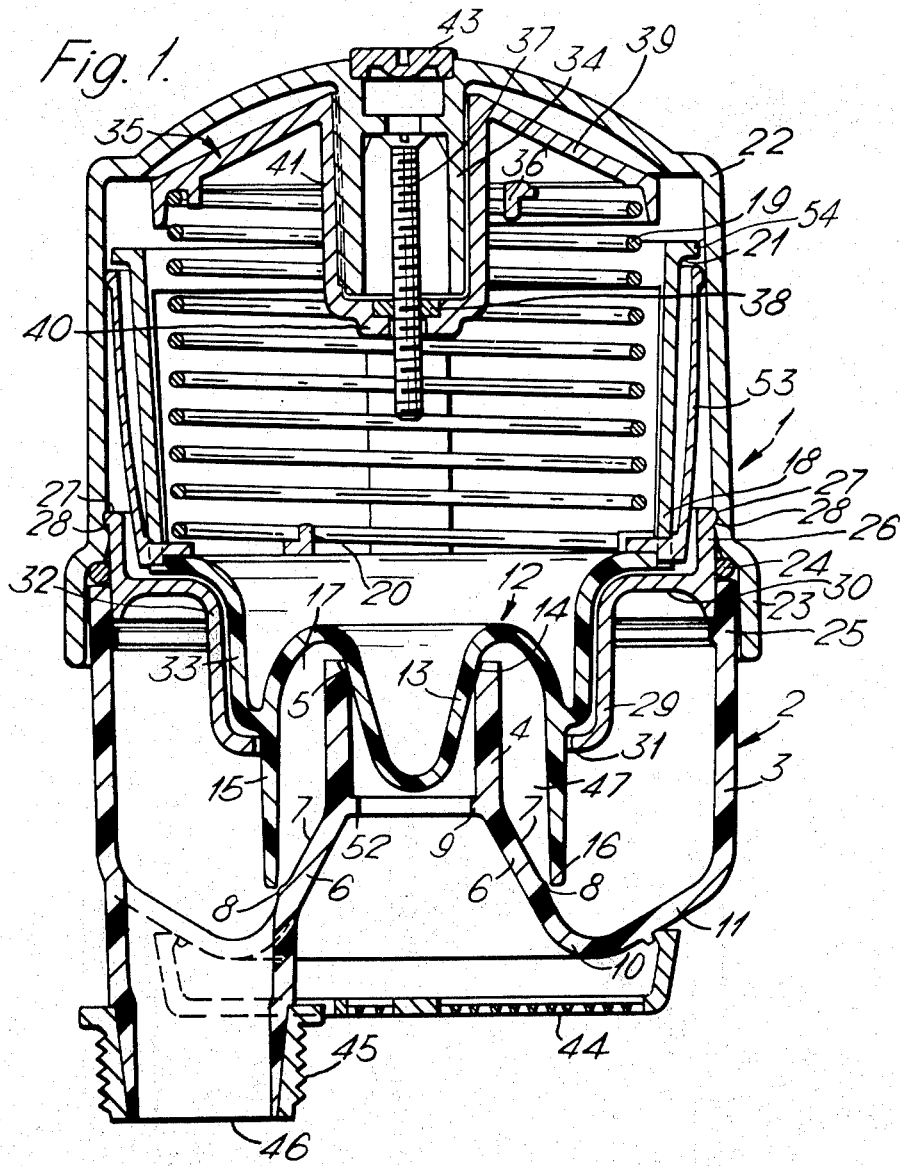
FIG. 1 is a cross section of a vacuum relief valve according to the invention.
Figure 2:
FIG. 2 is a fragmentary view to an enlarged scale of the bottom edge of a skirt and adjacent surface according to FIG. 1.

In the preferred form of the invention, a vacuum relief valve 1 which has been devised particularly though not solely for use in a milking machine, is constructed as follows:

A valve body 2, preferably, of a plastic molding, has a cylindrical portion 3 and, concentric with the cylindrical portion, is an air inlet 4. The air inlet is in the form of a tube having an open end, with the open end forming a valve seat 5. The tube is mounted on a member 6 having shaped substantially frusto-conical outer and inner surfaces, but inner surface 7 has a bead 8 (FIG. 2) and the junction between the inner frusto-conical surface and the inner surface of the air inlet tube, is formed by a narrow annulus 9 at right angles to the inner surface of the tube. This arrangement is such that at high air velocity, for example, between 60 and 100 cubic feet per minute at 15 inches of vacuum, the air flow into the air tube is deflected so that the stream lines of the air flow adjacent the wall of the tube are choked adjacent the aforesaid annulus. This provides control of the air flow at these high air flow rates, which it has been found to be satisfactorily stable in use. A base 10 of the body 2 connecting the bottom of the frusto-conical member to the cylindrical walls, is sloped with smooth curves from the base of the frusto-conical member with a straight portion 11 to the next smooth curve leading into the cylindrical portion. A valve head, or movable valve member 12 is also made from a plastic molding, and this head is provided with a conical portion 13 which, in use, extends within the valve seat, and the angle of the conical portion is related to an angled surface 14 of the inlet tube adjacent the valve seat so that there is about a 25° angle between the conical portion and the valve seat, such that the conical portion 13 rests on an inner part of the bevelled valve seat. A skirt 15 is concentric with the conical portion of the valve head, and this skirt has an end 16 which coacts with the frusto conical outer surface of the member supporting the air inlet tube. The conical portion 13 of the valve head is connected to the skirt by a curved concave annulus, 17, the radius of the curve of the annulus adjacent the conical portion being less than the radius of the curve adjacent the skirt. It will be seen a space 47 is provided between the skirt 15 and the air inlet 4.

On the opposite side of the skirt and conical portion, is a cup 18 adapted to receive a valve loading means in the form of a spring 19. The design of this spring is arranged so that it is a large diameter low rate spring which is open ended, and of equal pitch throughout its length. Supports, for example, pillars or pedestals, are provided 120° apart on the floor of the cup to provide an abutment for the spring so that the spring maintains its equal pitch when in its compressed working condition. The cup has a flange 21 at its upper open end, which flange is of cylindrical outer formation, and forms part of a guide, a further part of which will be described shortly. A cap 22 is provided, for the valve body, which cap encloses a valve chamber formed partly by the body, and partly by the cap. The cap has a socket 23 at one end, and an O ring 24 is fitted within the socket, with the socket fitting over open cylindrical end 25 of the valve body, thus forming a spigot and socket joint. A friction damping member 53 having fingers separated from each other moves with the cup 21, and bears on inner surface 54 of the cap 22 to give friction clamping of the movement of the valve member 12.

Mounted within the cap, adjacent the spigot and socket joint, is a mechanism guard 26 which has an annular rib 27 around a cylindircal portion thereof, which rib fits in a groove 28 in the cap to hold the mechanism guard in position. The guard has a concentric cylindrical tube 29 connected by an annular disc 30 to the outer cylindrical portion, and inner surfaces 31 of the cylindrical tube are shouldered to form a guide for the skirt 15 of the movable valve member 12. Upper inner surfaces 32 of the cap are also provided with sliding surfaces which coact with outer edge 33 of the cup of the movable valve member to form a complete guide for the upper part of this cap. Both these guides are loose fitting, for example, 0.020 clearance, since the seating of the conical portion 13 of the valve on the valve seat 14 in itself forms a guide. Mounted within the upper part of the cap is a tube 34 of small diameter, and a spring abutment 35 having supports in the form of pedestals 36 as above described to support the open end of the spring. The abutment 35 is fixed in the tube 34 by a screw 37 passing through a threaded insert 38 in the spring abutment. The spring abutment comprises a flattened conical member 39 having a short cylindrical member 40, and a longer tubular member 41, movement of the screw 37 relative to the cap 22 by passing a screwdriver downwardly through the tube in the cap will thus move the abutment to or from the cap according to the direction of rotation of the screw, thus adjusting the spring loading. A sealing button 43 is provided, which can be sealed in the cylindrical screw hole in the cap so that, once adjusted in the factory, sealing may be effected. An air screen 44 is provided for the air inlet, comprising a suitable screen clipped onto the lower part of the valve body, with suitable ribs being provided.

A mounting thread 45 is provided on an air outlet 46 because the necessary large outlet for high flow rates makes a rubber connecting tube impracticable.

Figure 3:
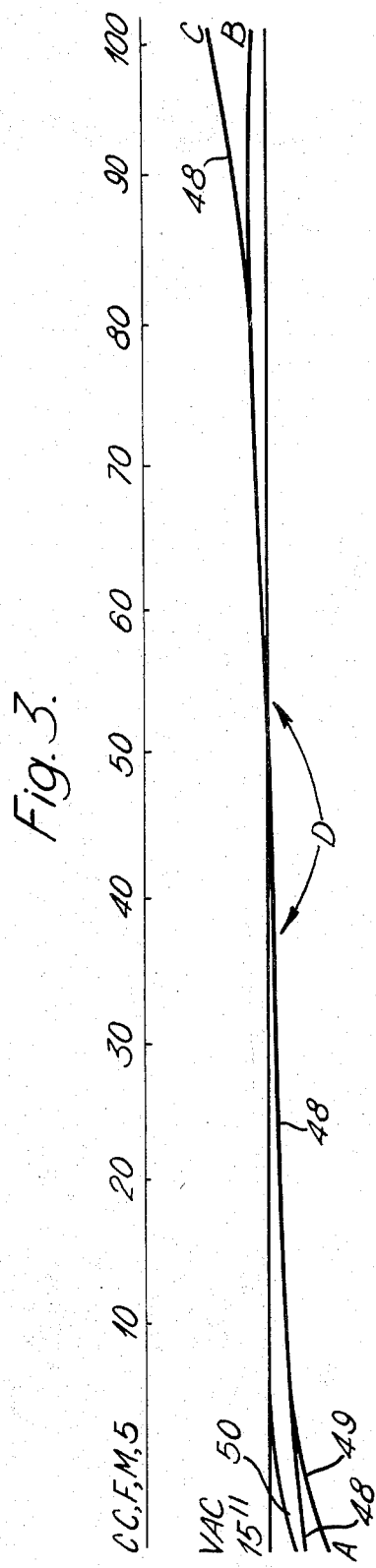
FIG. 3 is a graph showing performance of the valve characteristics shown in FIG. 1.

The operation of the construction is as follows:

It will be assumed that the spring has been suitably adjusted, and the device is to be used on a milking machine. The vacuum pump of the milking machine is activated, and when the vacuum reaches a predetermined figure, for example, 15 inches of mercury, the vacuum within the valve chamber will so reduce the pressure therein that air pressure against the conical portion 13 of the movable valve member 12 will lift that member from its seat 14, against the force of the loading means, for example, the spring. This compresses the spring, and allows air to enter. At low air flows, the air passing between the bead 8 and the skirt edge 16 of the movable valve member, will cause some reaction lift to the valve head or movable member. This lift is assisted by the partial imprisonment of air in the space 47 and thus against the skirt 15 giving a further lift to the valve member. This is adjusted so that there is some slight variation in pressure necessary at very low air rates since, if regulation is too close, then there is some slight instability in operation of the valve. As may be seen from FIG. 3 curve 48 shows the effect of the shape of the valve seat and reaction curve obtainable with the construction above described. At higher rates of flow the valve operates in a manner such that very little change in pressure is necessary to open the valve or close the valve so as to maintain close pressure regulation. The presence of the bead 8 corrects the lower end of curve 48 from that shown at 49 and curve 50 shows a too flat unstable curve. Curve 51 shows the too flat unstable curve obtained without the sharp corner 52 given by the annulus 9. Thus, at high air flows, the effect of the annulus 9 between the inner curved surface of the inlet tube and the adjacent frusto-conical surface causes choking of air inflow, again permitting stable operation of the valve to give reasonably close yet stable pressure regulation at such high air flows.

The advantages of the construction are as follows:

1. Maximum air flow is quadrupled as compared with previous vacuum relief valves such as that described in New Zealand Pat. No. 100138. Air flows to over 100 cubic feet per minute of expanded air in the milking machine are possible.

2. Vacuum variation for each cubic foot per minute is less.

3. Because the loading means comprises a large diameter low rate spring weighing only a few ounces, the necessity for a heavy weight is avoided. It would be necessary to use a weight of about 3½ lbs. in order to close the new valve at a vacuum of 15 inches of mercury. The low rate spring is used for the following reasons:
(a) it is cheaper to produce than a weight.
(b) the lighter weight, only one eighteenth of the weight used in a valve to Pat. No. 100138 allows a smaller simpler shipping pack to be used.
(c) reduction in size and weight reduce shipping costs.
(d) screw adjustment for the required vacuum results in lower assembly costs than accurate weighing and adjustment of each weight.
(e) accurate vertical mounting of the valve is not necessary.

4. The operating mechanism, consisting of the spring, spring adjustment, valve guides, and frictional damping, are all factory sealed into the upper removable body, i.e., the cap of the regulator. The moving parts are thus sealed from fouling, which occurs wherever the high velocity air stream passes any surface. All surfaces which may be fouled are smoothed, and are readily accessible for cleaning, by simply removing the cap which is normally held in place by gravity and friction.

5. The snap-on air screen is quickly removed for cleaning.

6. At very low air flow, the reaction skirt is very close to the cone formed in the regulator base, and thus increases the reactive valve lift at the lower end of the air flow range, with a decreasing effect as the valve lifts higher.

7. The regulator is screwed into position in the milking machine, because the necessary large outlet makes a rubber tube connection impracticable.

8. The operating spring is open ended, and of equal pitch throughout its length. Because the spring rests on three pedestals 120° apart, each of which is adjusted to give equal pitch to the spring in its compressed working condition a more satisfactorily controllable low rate spring is provided, in which the rate does not materially vary, due to the bottoming of coils of the spring adjacent the ends thereof.

9. Due to the quadrupled airflow to over 100 C.F.M. of expanded air in the controlled milking machine, it is expected to adequately cater for all machines in the foreseeable future.

I claim:

1. A vacuum relief valve comprising means defining a valve chamber, said valve chamber having an air inlet tube leading thereto, said air inlet tube having a valve seat, an air outlet leading from said valve chamber, a valve member movable in said valve chamber, said valve member having a conical portion, a skirt concentric with the conical portion and a curved annular portion joining the conical portion and skirt, said conical valve portion, in use, coacting with said valve seat to close the valve chamber when the movable member is in contact with the valve seat, said skirt of said valve member surrounding said air inlet tube, but being spaced apart therefrom, loading means operably related to said movable valve member for loading the valve member, so that a desired degree of reduced pressure is necessary within the valve chamber before the conical portion of the movable member will lift from the valve seat, a shaped substantially frusto-conical member on which the air inlet tube is mounted, the length of the skirt being adjusted in relation to the wall of said frusto-conical member and the angle and profile of the surface of said frusto-conical member being formed so that in use, on the conical portion of the movable valve member lifting from the valve seat, a flow of air past said conical portion and around said curved annular portion, will cause an added thrust due to reaction to the movable valve member which will result in increased sensitivity of the valve, and the passage of air between a lower edge of said skirt and the adjacent frusto-conical member will cause an added lift of the movable valve member at the lower end of the air flow range due to the restriction of the opening between the edge of the skirt and the adjacent part of the frusto-conical member.

2. The pressure relief valve as claimed in claim 1, wherein said skirt is of a length such that when the valve is closed, the lower end of the skirt is a short distance from a lower outer portion of said substantially frusto-conical member.

3. The pressure relief valve as claimed in claim 2, wherein said substantially frusto-conical member has a bead thereon adjacent said skirt when the valve is in the closed position to reduce the size of the air passageway when the valve is open and air is flowing at a low rate.

4. The pressure relief valve as claimed in claim 1, wherein at low air inflow, said skirt is close to the frusto-conical member and increases the reactive valve member lift at the lower end of the air flow range.

5. The pressure relief valve as claimed in claim 1 wherein an annular flat surface is provided at the junction between the tube and the frusto-conical member surface so that at higher air flows, the air streamlines will be directed inwardly to give a choking effect through the air inlet in order to control the flow of air to avoid instability of the valve member at high flows.

6. The pressure relief valve as claimed in claim 1 including a guide defining part of a guard in which the valve member is guided in said valve chamber, the two combining so that air flow past the guiding part of said guard and the guides which are part of said valve member move, said guides being shielded against fouling.

7. The pressure relief valve as claimed in claim 6 wherein said loading means comprise a hollow cup within the valve member, a spring abutment therein, an open ended low rate spring mounted within said cup, said spring resting on supports in said abutment, the required height of each support being adjusted to give substantially equal pitch to the spring when it is in the compressed working condition, said spring abutting against a further abutment mounted in said valve chamber, and said abutment having similar supports to said cup supports.

8. The pressure relief valve as claimed in claim 1, wherein the curved annular portion joining the conical portion and skirt is defined by a compound curve which is of lesser radius adjacent the valve seat, and of greater radius adjacent the inner cylindrical wall of the skirt.

9. The pressure relief valve as claimed in claim 8, wherein said valve chamber includes two parts, a valve body having a cylindrical part, said air inlet tube being centrally disposed of said cylindrical part, and the air outlet being disposed to one side thereof, and a cap member having a cylindrical portion to be sealed to the valve body.

10. The pressure relief valve as claimed in claim 9 wherein said cap member has operably related thereto said guard and associated guide.

11. The pressure relief valve as claimed in claim 10 wherein said spring abutment in said cup is adjustable by a screw relative to said cap member, so that the valve loading may be readily adjusted, and sealing means provided to enable access to the screw to be sealed when a valve has been correctly adjusted.

12. The pressure relief valve as claimed in claim 11 wherein damping means secured to a part of said movable valve member bear against the inner surface of the cap to provide friction damping thereof.

13. A vacuum relief valve including a valve member movable in a valve chamber from a valve seat communicating with an air inlet defined by a tube against loading means to open the valve, wherein air deflecting means are operably related to a face of the valve member adjacent to the air inlet so that in use the air entering through the air inlet is so deflected by said deflecting means that the consequential added thrust applied to the valve member will result in increased sensitivity of the valve, and in which at least one of the following features is added:

a. the air inlet tube being mounted on a member having a frusto-conical outer surface, and the valve member having a skirt extending to a position which is adjacent said frusto-conical surface so that at low air inflow, said skirt is close to the surface, and increases the reactive valve member lift at the lower end of the air flow range;

b. the air inlet tube being mounted on a member having an inner frusto-conical surface, there being an annular flat surface at the junction between the tube and the frusto-conical surfaces so that at higher air flows, the air streamlines will be directed inwardly to give a choking effect through the air inlet in order to control the flow of air to avoid instability of the valve member at high flows;

c. the valve member being guided in said valve chamber by a guide forming part of a guard, the two combining so that air flow past the guiding part of said guard and the guides which are part of said valve member move, said guides being shielded against fouling;

d. said loading means comprise a hollow cup within the valve head, a spring abutment therein, an open ended low rate spring mounted within said cup spring resting on supports in said abutment, the required height of each support being adjusted to give substantially equal pitch to the spring when it is in its compressed working condition, said spring abutting against a further abutment mounted in said valve chamber, said abutment having similar supports to said cup supports.

* * * * *